United States Patent Office 2,955,111
Patented Oct. 4, 1960

2,955,111

SYNTHESIS OF N-ALKYL-PIPERIDINE AND N-ALKYL-PYRROLIDINE-α-CARBOXYLIC ACID AMIDES

Bo Thuresson af Ekenstam, Bofors, and Bror Gösta Pettersson, Karlskoga, Sweden, assignors to Aktiebolaget Bofors, Bofors, Sweden, a corporation of Sweden No Drawing. Filed Jan. 28, 1957, Ser. No. 636,453

3 Claims. (Cl. 260—294)

This invention relates to N-alkyl-piperidine and N-alkyl-pyrrolidine-α-carboxylic acid amides; and in particular is directed to novel methods of preparing said amides having the formulae:

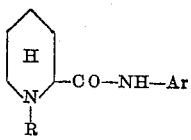

and

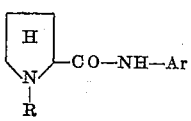

In the aforesaid formulae the symbol R designates an alkyl radical, and the symbol Ar designates a 2-alkyl benzene or a 2,6-dialkyl benzene radical.

The said amides have proved to be extremely good local anesthetics, the anesthetic effect of which is vastly superior to that of procaine.

In general the syntheses in accordance with this invention are carried out by the following series of steps:

A suitable malonic acid compound, as for example, an ester such as ethyl malonate, is reacted with an aromatic amine corresponding to the desired amido radical in the end product to form the malonic acid monoarylamide ester, which is then nitrosated, and the nitroso malonic acid compound thus formed is reduced to form the corresponding amino-malonic ester arylamide.

The amino-malonic ester arylamide is then reacted with a polymethylene dihalogenide, as, for example, tetra or trimethylene bromide to form the corresponding amino, bromo-alkyl malonic ester arylamide. The latter is then treated with an acid, as for example, a mineral acid to effectuate decarboxylation and ring closure with formation of the corresponding polymethylene imine-α-carboxylic acid amide, which is then alkylated at the imino position to produce the desired arylamide.

The following are illustrative examples in accordance with this invention.

Example 1

121 parts by weight of 2,6-xylidine are heated with 400 parts of diethylmalonate at 160° for 1 hour, and the alcohol formed by the reaction is allowed to distill off. Thereafter the reaction mass is cooled to 80° C., and 500 parts of alcohol are added. After cooling the dixylidide is sucked off, and the alcohol solution with malonic ester monoxylidide is poured into 2,000 parts of water. The monoxylidide precipitates, is filtered off and washed with water, and re-crystallized in diluted alcohol. Nitrosation thereafter takes place by dissolving the dried monoxylidide in chloroform and by introducing nitrosyl chloride at 0° C. until the nitrosation is completed. The isonitrosomalonic ester xylidide is filtered off and dried. Thereafter the reduction takes place with zinc powder and formic acid at 90–100°. The formic acid is distilled off, and the remainder dissolved in warm benzene and washed with a bicarbonate solution to a neutral reaction. After the benzene has been distilled off, the amino-malonic ester xylidide is obtained. This is treated with an equal quantity of sodium ethylate and boiled with twice the theoretical quantity of tetramethylene bromide in absolute alcohol. After 6 hours of boiling, the sodium bromide formed is separated, and the mixture is steam-distilled in order to remove the excess of tetramethylene bromide. The remaining oil, which mainly consists of delta-bromo-butylaminomalonic ester xylidide is separated from the water and boiled with 3 parts of concentrated hydrochloric acid for 3 hours. Thereafter carbon-filtering and evaporation to dryness under vacuum takes place. The residue is dissolved in water, and the pH adjusted with sodium hydroxide to 5.5. The solution is extracted twice with ether, and the water is made strongly alkaline with sodium hydroxide. The oil precipitates and is crystallized after a time. The crystals are separated and dried under vacuum. The pipecolyl xylidide obtained is heated on a water bath with 2 parts of diethyl sulphate for 3 hours. Water is added and the solution is extracted with ether. Sodium hydroxide is added to adjust the pH to 5.5 and the solution is carbon-treated. The base is precipitated with sodium hydroxide, filtered off, and dried. The base obtained consists of N-ethyl-pipecolyl-2,6-xylidide and is sufficiently pure for the preparation of salts.

Example 2

250 parts by weight of aminomalonic ester xylidide are treated with an equivalent quantity of sodium ethylate and boiled for 6 hours with twice the theoretical quantity of trimethylene bromide in absolute alcohol. The sodium bromide is separated and the mixture is steam-distilled in order to remove the excess of trimethylene bromide. The remaining oil, which consists of gamma-bromopropylaminomalonic ester xylidide is separated off and boiled with 3 parts of concentrated hydrochloric acid for 3 hours. Thereafter carbon-filtering and evaporation in vacuum is carried out. The remainder is dissolved in water and the pH is adjusted with sodium hydroxide to 5.5. The solution is extracted with ether a few times. The base is precipitated with sodium hydroxide from the water solution and extracted with ether. After the ether has been distilled off, pyrrolidine-α-carboxylic acid xylidide in the form of an oil is obtained. The oil is heated with 1 part of dimethyl sulphate on a water bath for 5 hours, dissolved in water and carbon-treated at pH 5.5. From the water solution the base is precipitated with sodium hydroxide as crystals, which are filtered off and washed with water. The base obtained consists of N-methylprolyl-2,6-xylidide, which can be used for the preparation of salts.

Example 3

Pipecolyl-2.6-xylidide produced according to Example 1 is alkylated by boiling for 10–20 hours with 0.6 part n-butylbromide in an n-butanol solution in the presence of 0.5 part potassium carbonate. The potassium carbonate is filtered off and the butanol is distilled off in vacuum. The residue is dissolved in diluted hydrochloric acid and carbon treated, after which the base is precipitated with sodium hydroxide in the form of white crystals, which are filtered off and washed with water. The base obtained, which consists of N-n-butylpipecolyl-2.6-xylidide is sufficiently pure for the production of salts.

Example 4

α-Pyrrolidine carboxylic acid-2.6-xylidide produced according to Example 2 is alkylated by boiling for 10–20 hours with 0.6 part n-propyl bromide in a propanol solution in the presence of 0.5 part potassium carbonate. The working up and purification is carried out in the same way as Example 3. The base obtained, which consists of N-n-propyl-prolyl-2,6-xylidide is sufficiently pure for the production of salts.

In carrying out the amidification of the malonic acid ester to form the malonic acid monoaryl-amide ester there can be used the following 2-alkyl and 2.6-dialkyl anilines:

2-methyl-aniline
2.6-diethyl-aniline

It will be understood that the foregoing description of the invention and the examples set forth are merely illustrative of the principles thereof. Accordingly, the appended claims are to be construed as defining the invention within the full spirit and scope thereof.

We claim:

1. Method of preparing members of the group consisting of (I) 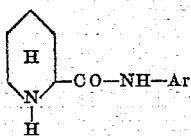

and (II) 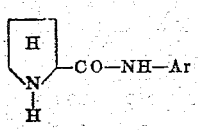

wherein the symbol Ar designates a member of the group consisting of 2-lower alkyl phenyl and 2,6-di-lower alkyl phenyl radicals which comprises: nitrosating a malonic acid arylamide of the general formula:

(III) 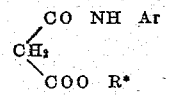

wherein Ar has the significance above defined and R* designates an alkyl radical by dissolving said amide in an inert solvent and passing nitrosyl chloride through said solution; reducing the nitrosation product to form the corresponding amino compound having the formula:

(IV) 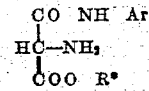

by the addition thereto of zinc and formic acid; reacting said amino compound with 2 moles of a polymethylene dihalogenide to form the corresponding amino, halogeno-alkyl-compound having the formula:

(V) 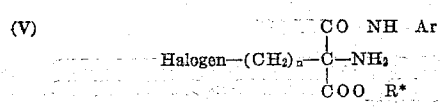

wherein "*n*" is an integer of 3 to 4 by boiling in the presence of an amount of sodium ethylate equivalent to that of said halogeno-alkyl compound; heating said compound in the presence of mineral acid to effectuate ring closure and decarboxylation to form the arylamide of the polymethylene imine-α-carboxylic acid.

2. Method of preparing pipecolyl-2,6-xylidide in accordance with claim 1 wherein the intermediately formed

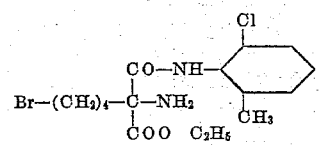

is heated in the presence of mineral acid to effect ring closure and decarboxylation to form pipecolyl-2,6-xylidide.

3. The method of preparing proline-2,6-xylidide in accordance with claim 1 wherein the intermediately formed

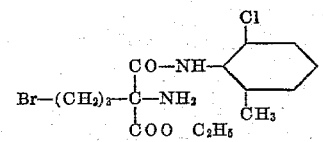

is heated in the presence of mineral acid to effect ring closure and decarboxylation to form prolyl-2,6-xylidide.

References Cited in the file of this patent

UNITED STATES PATENTS 2,528,928     Weisblat et al.     Nov. 7, 1950
2,799,679     Ekenstam     July 16, 1957

OTHER REFERENCES

Albertson et al.: J. Am. Chem. Soc., vol. 71, pp. 2818–2820 (1949).